United States Patent [19]

Katsuno et al.

[11] Patent Number: 4,905,928
[45] Date of Patent: Mar. 6, 1990

[54] LOCKING APPARATUS FOR WEBBING RETRACTOR

[75] Inventors: Mitsuaki Katsuno; Shinji Mori, both of Niwa, Japan

[73] Assignee: Kabushiki Kaisha Tokai-Rika-Denki Seisakusho, Aichi, Japan

[21] Appl. No.: 353,600

[22] Filed: May 18, 1989

[30] Foreign Application Priority Data

May 20, 1988 [JP] Japan .................... 63-66418

[51] Int. Cl.$^4$ ............................ B60R 22/38
[52] U.S. Cl. .............................. 242/107.4 B
[58] Field of Search ............ 242/107.4 B, 107.4 A, 242/107.4 C, 107.4 R; 280/806; 297/478, 480

[56] References Cited

U.S. PATENT DOCUMENTS 4,749,142  6/1988  Saitow ............... 242/107.4 B X

Primary Examiner—John M. Jillions
Attorney, Agent, or Firm—Oliff & Berridge

[57] ABSTRACT

A locking mechanism applied to a retractor for winding up on a take-up shaft a webbing which fastens an occupant of a vehicle is designed to prevent the unwinding of the webbing when the vehicle suddenly decelerates. A lock wheel, that follows the rotation of the take-up shaft, maintains movable lock members rotating together with the take-up shaft at a position where the movable members are separated from fixed lock members. Upon sudden deceleration of the vehicle the lock wheel creates a rotational lag with respect to the take-up shaft, whereby the lock plates are engaged with the fixed lock members by the lock wheel, thereby preventing the rotation of the take-up shaft in a webbing unwinding direction.

The movable lock members are pressed in the direction of the axis of the take-up shaft by an elastic body projected from the lock wheel, whereby clatter due to the vibrations of the vehicle is abolished.

20 Claims, 5 Drawing Sheets

LOCKING APPARATUS FOR WEBBING RETRACTOR

BACKGROUND OF THE INVENTION

1. Field of the Invention

The present invention relates to a locking apparatus for a webbing retractor that prevents a take-up shaft winding up an occupant-restraining webbing from rotating in an unwinding direction of the webbing to prevent the webbing from being unwound from the retractor upon the deceleration of a vehicle or the like.

2. Description of the Related Art

This kind of locking apparatus are constructions in which a turning wheel and a lock plate rotating together with a take-up shaft are arranged. The turning wheel on this kind of locking apparatus causes a rotational lag in a webbing unwinding direction toward the take-up shaft upon the deceleration of the vehicle or the like. This moves the lock plate across in the direction of the take-up shaft axis, thereby preventing the take-up shaft from rotating in a webbing unwinding direction.

However, in a locking apparatus of this structure the lock plate is arranged spacedly in a direction of the take-up shaft axis to be allowed to be moved freely in a direction across the take-up shaft. Therefore a problem arose in that the looseness of the lock plate in an axial direction of the take-up shaft causes a clattering noise due to vibration occurring in ordinary running condition of the vehicle. Especially, in the webbing retractor applied to a rear seat of the vehicle where the take-up shaft is arranged in a vertical direction, a clattering noise is very pronounced, because the lock plate is arranged floating in the vertical direction corresponding to the main vibratory direction of the vehicle during ordinary running condition of the vehicle.

SUMMARY OF THE INVENTION

The object of the present invention is, considering the above facts, to provide a locking apparatus for a webbing retractor where a clattering noise due to the looseness of the lock plates can be prevented.

A locking apparatus for a webbing retractor according to the present invention has a lock plate disposed around a take-up shaft winding up an occupant restraining webbing and following the rotation of the take-up shaft and a turning wheel connected to the take-up shaft to follow the rotation of the take-up shaft. The lock plate is arranged in a floating manner in a direction of the take-up shaft axis so as to be movable in a direction across the take-up shaft axis. The turning wheel is also connected to the lock plate, creating a rotational lag toward the take-up shaft in an unwinding direction of the webbing. Thereby the turning wheel causes the lock plate to move in the direction across the take-up shaft axis, thereby preventing the rotation of the take-up shaft in the webbing unwinding direction. The turning wheel is provided integrally with an elastically deformable flexible member, and the flexible piece is caused to abut on the lock plate so that the lock plate is pressed on the side opposed to the turning wheel by the elastic force of the flexible member.

Consequently, the lock plate is pressed by the elastic force of the flexible member against the opposite side of the turning wheel, thereby abolishing the clatter caused in the direction of the take-up shaft axis by vehicle vibration and the like.

DESCRIPTION OF THE PREFERRED EMBODIMENTS

Figure 1:
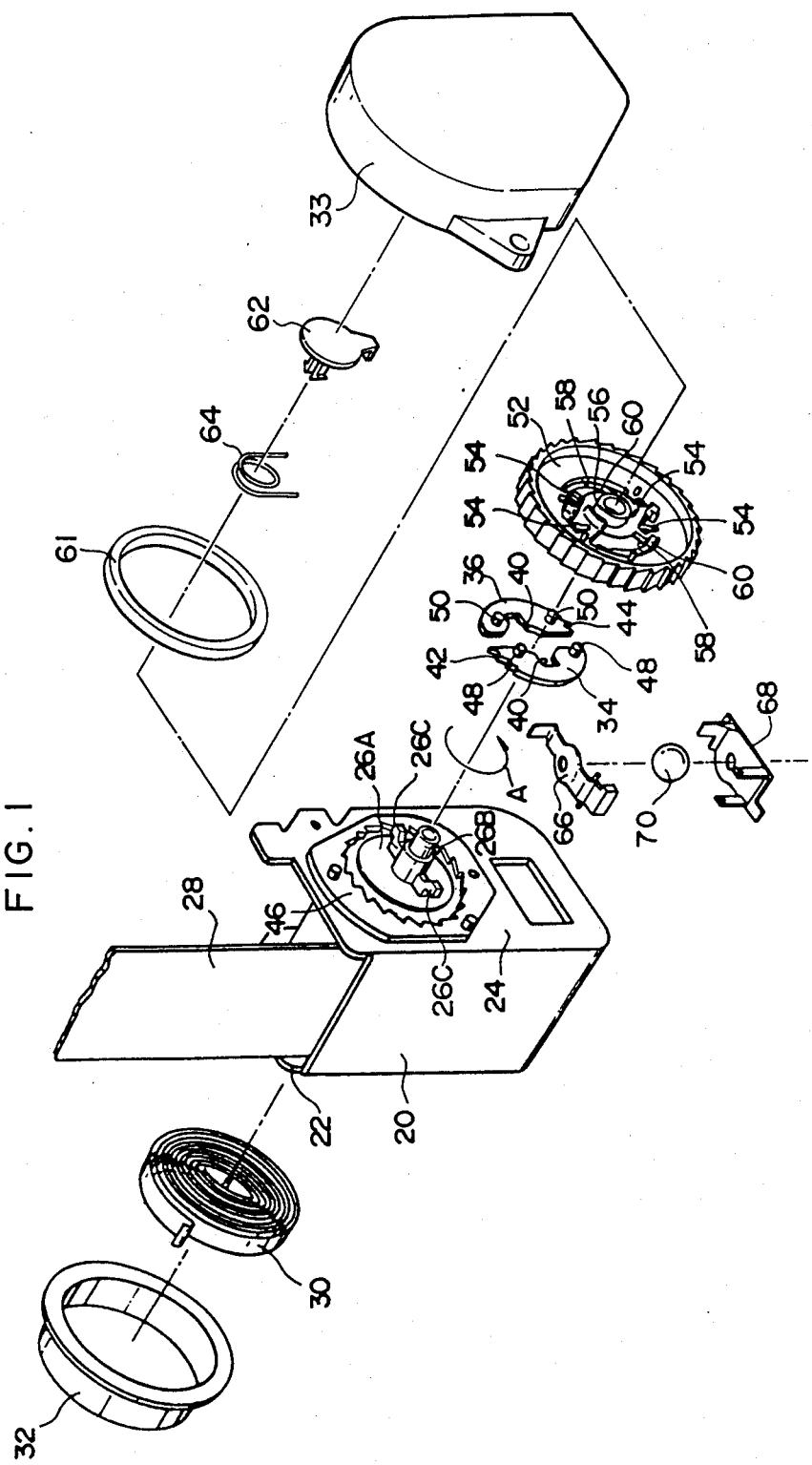
FIG. 1 is an exploded, perspective view of an embodiment of the present invention.

FIG. 1 is an exploded perspective view showing a webbing retractor to which one embodiment of a locking apparatus for a webbing retractor according to the present invention is applied.

Extending from the base portion of a frame 20 that is mounted on a vehicle are a pair of leg portions 22, 24 that are parallel to each other. A take-up shaft 26 is rotatably supported by the leg portions 22, 24 and one longitudinal end of an occupant restraining webbing 28 is attached to the take-up shaft 26.

One end of the take-up shaft 26 projects from the leg portion 22 to the outside and is fastened to the inner end of a coil spring 30. The outer end of the coil spring 30 is fixed to a spring cover 32 which houses the coil spring 30. The take-up shaft 26 therefore receives the resilience of the coil spring 30, and recoils the webbing 28 in the direction of arrow A in FIG. 1, winding up the webbing 28 in layers. When unwinding the webbing 28, the take-up shaft 26 is rotated against the resilience of the coil spring 30.

The other end of the take-up shaft 26 projects to the exterior through the leg portion 24. Projecting coaxially from the end surface 26A of the take-up shaft 26 is a small diameter shaft 26B. Mounted in the vicinity of the base of the small diameter shaft 26B is a forked-shaped protrusion 26C. Disposed around this protrusion 26C are two lock plates 34, 36 as well as a lock wheel 52 being a turning wheel and overlapping the lock plates 34, 36. The lock plates 34, 36 and the lock wheel 52 are covered by a sensor cover 33.

Figure 2:
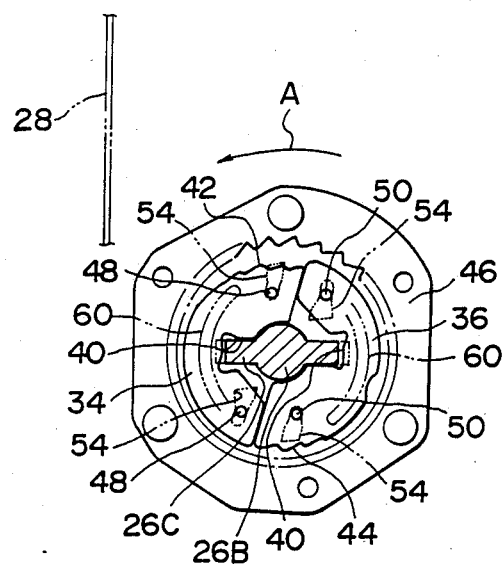
FIG. 2 and 3 explain the function of the lock plates of FIG. 1 from a frontal view.

The lock plates 34, 36 are arranged in the axial direction with a slight margin for floating between the end surface 26A of the take-up shaft 26 and the lock wheel 52. Formed in the center portion of each of these respective lock plates 34, 36 is a recess 40 of a substantially U shape, so that each of the lock plates 34, 36 are constituted in a substantially letter C form. As shown in FIG. 2, the protrusion 26C of the take-up shaft 26 is fitted into the recess 40 in a manner, thereby enabling each of the lock plates 34, 36 to follow the rotation of the take-up shaft 26. The dimension of the width of the recess 40 (length of the vertical direction in FIG. 2) is formed, as shown in FIG. 2, slightly larger than the dimension (same as above) of the protrusion 26C, so that the lock plates 34, 36 rotate relatively with respect to the take-up shaft 26 only at a predetermined angle.

Formed on one ends of these lock plates 34, 36 are pawl portions 42, 44 opposed to the lock teeth of a ratchet wheel 46 fixed to the leg portion 24. Further, a pair of pins 48, 50 project from each of the lock plates 34, 36 respectively and are received into slots 54 formed in the lock wheel 52.

As shown in FIG. 1, a boss portion 56 is formed in the center of the lock wheel 52. The small diameter shaft 26B of the take-up shaft 26 is inserted into this boss portion 56, so that the lock wheel 52 is able to rotate relatively with respect to the take-up shaft 26. A concave portion is formed in the lock wheel 52 on the side opposite to the lock plates 34, 36. A ringlike mass body not shown)is fitted into this concave portion To prevent the lock wheel 52 from slipping off the small diameter shaft 26B, the lock wheel 52 is held by a clip 62 at the tip of the small diameter shaft 26B. The clip 62 is attached to the small diameter shaft 26B in a manner that it rotates together with the take-up shaft 26. A torsion coil spring 64 is interpositioned between the clip 62 and the lock wheel 52. The coil portion of the torsion coil spring 64 is fitted into the boss portion 56 of the lock wheel 52. One end of the torsion coil spring 64 is fastened by the clip 62, the other end of the torsion coil spring 64 is attached to the main part of the lock wheel 52, so that the lock wheel 52 is resilient with respect to the clip 62 and the take-up shaft 26 in an unwinding direction of the webbing 28 (counter to the direction of arrow A in FIG. 1).

As shown in FIG. 2, through the resilience the pins 48, 50 of the lock plates 34, 36 are positioned into one end of the slots 54 and in conjunction with disengaging the pawl portions 42, 44 from the ratchet wheel 46, the lock wheel 52 is in this way prevented from further rotation with respect to the take-up shaft 26 in the webbing unwinding direction. This state of the lock plates 34, 36 is maintained unless relative rotation occurs between the lock wheel 52 and the take-up shaft 26.

Figure 3:
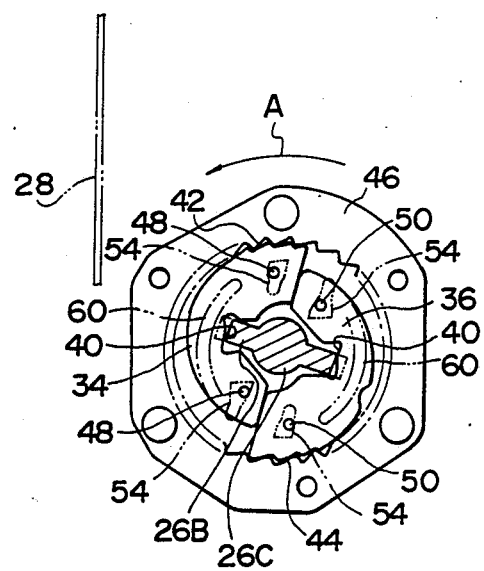

In the case that the torsion coil spring 64 is deformed against the resilience of the torsion coil spring 64 and the take-up shaft 26 rotates relatively with respect to the lock wheel 52 in the webbing unwinding direction, the lock wheel 52 creates a rotational delay or lag with respect to the take-up shaft 26 and the take-up shaft 26 presses against the lock plates 34, 36. Thereby, the pins 48, 50 are guided along the slots 54 and the lock plates 34, 36 are moved in a longitudinal direction of the slots so that the pawl portions 42, 44 are engaged with the ratchet wheel 46, as shown in FIG. 3.

Figure 4:
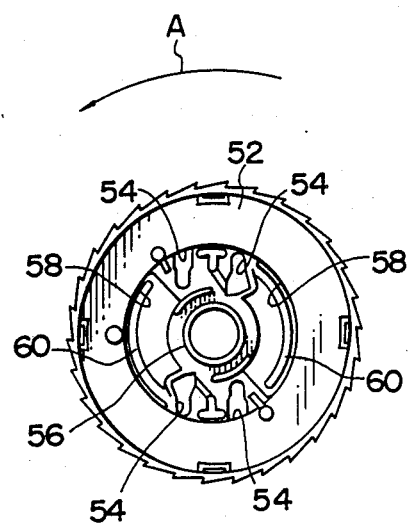
FIG. 4 is a frontal view of the construction of the lock wheel of FIG. 1.

The lock wheel 52, has, as shown in FIG. 4, two fan shaped through holes 58 around the boss portion 56 in which flexible members 60 are disposed. One end of each of the flexible members 60 is connected as a whole into the inner circumference of each of the through holes 58. The intermediate portion of each of the flexible members 60 is bent coaxially in the form of an arc to the take-up shaft 26.

Figure 5:
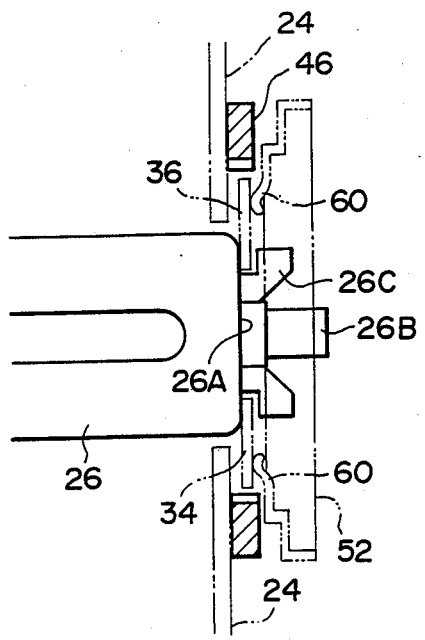
FIG. 5 is a cross-sectional view of the parts surrounding the lock plate of FIG. 1.

As shown in FIG. 5, the end portion of each of the flexible members 60 is bent in the axial direction of the take-up shaft 26 to project from each of the through holes 58 towards each of the lock plates 34, 36, making contact with each of the lock plates 34, 36 outside each of the through holes 58. Each of the flexible members 60 is thin, and elastically deformable. The elastic force of each of the flexible members 60 presses each of lock plates 34, 36, against the end face 26A (which is a step portion) of the take-up shaft 26 opposed to the lock wheel 52 so as to abolish the clatter of the take-up shaft 26 in the axial direction of the take-up shaft 26. Further, in the present embodiment, each of the flexible members 60 extends out in the webbing unwinding direction (direction of arrow A in FIG. 4), so that, when the lock wheel 52 causes a rotational lag in the webbing unwinding direction with respect to the take-up shaft 26 and the lock wheel 52 is rotated relative to the take-up shaft, the end portion of each of the flexible members 60 is prevented from catching on the lock plates 34, 36.

As shown in FIG. 1, a pawl 66 is provided below the lock wheel 52. One end of the pawl 66 is rotatably supported by a sensor bracket 68 which is fixed to the leg portion 24. The intermediate portion of the pawl 66 comes in contact with an upper portion of a sensor ball 70 disposed in a small diameter hole formed in the sensor bracket 68. The other end portion of the pawl 66 is opposed to the ratchet teeth formed in the outer circumference of the lock wheel 52.

The inertia force of a sudden deceleration of the vehicle causes the sensor ball 70 to rise out of the small diameter hole in the sensor bracket 68. The sensor ball 70 then presses against the pawl 66 causing it to rise up and engage the other end portion with the ratchet teeth formed in the outer circumference of the lock wheel 52, thereby preventing rotation of the lock wheel 52 in the webbing unwinding direction.

In this way, the above-constructed webbing retractor is attached to a body of the vehicle through the frame 20 by bolts. When this webbing retractor is used in a three point seat belt device where a shoulder webbing and a lap webbing is connected integrally to each other so that a continuous type webbing is constructed, one end of the webbing 28 is unwound from the take-up shaft 26 and attached to the vehicle body by means of an anchor member (not shown). The intermediate portion of the webbing 28 is turned around a slip joint fixed to the vehicle body. Additionally, in the intermediate portion of the aforementioned anchor member and the slip joint a tongue plate is slidably mounted in a longitudinal direction of the webbing 28 (not shown). When the seated occupant unwinds webbing 28 from the take-up shaft 26 and fits the aforementioned tongue plate into the buckle device that mounted on the vehicle body, the occupant assumes a seatbelt fastened position.

The following is a description of the operation of this embodiment. During running condition of the vehicle the motion of the fastened webbing 28 follows position changes of the occupant. The webbing 28 is freely unwound from and wound upon the take-up shaft 26, so that the occupant is not restricted by the webbing 28. In other words, by ordinary rotation of the take-up shaft 26 the torsion coil spring 64 is not deformed because no relative rotation occurs between the take-up shaft 26 and the lock wheel 52.

Here, the lock plates 34, 36 come in contact with the flexible members 60 of the lock wheel 52 and because they are pressed to the end surface 26A of the take-up shaft 26 by the elastic force of the flexible member 60, the lock plates 34, 36 are prevented from a clatter due to vibration of the car and a clattering noise due to the clatter is prevented.

In the case of the occupant with fastened webbing 28 changing abruptly the position of the upper body of his body, the webbing 28 is rapidly unwound from the take-up shaft 26. At this time the take-up shaft 26 will also be rotated rapidly. Therefore, in one instant a great force acts upon the torsion coil spring 64, by the acceleration mainly acting upon the mass body through the lock wheel 52, thereby deforming the torsion coil spring 64 against its resilience. In this way a rotational lag is created in the lock wheel 52 with respect to the take-up shaft 26. The lock plates 34, 36 are pressed against by the take-up shaft 26 and the pawl portions 42, 44 are engaged with the ratchet wheel 46, as shown in FIG. 3, thereby preventing the rotation of the take-up shaft 26 in the webbing unwinding direction, because the pawl portions 42, 44 engage the teeth of the ratchet wheel 46.

In this way the occupant is restrained by the webbing 28.

Furthermore, in the case that the vehicle suddenly decelerates, the pawl 66 fluctuates because it is pushed by the sensor ball 70 that rises out of the small diameter hole in the sensor bracket 68 due to the force of inertia. The pawl 66 interlocks with the lock wheel 52, whereby the lock wheel 52 is prevented from rotating in the webbing unwinding direction.

Consequently, the lock wheel 52 creates a rotational lag with respect to the take-up shaft 26 rotated additionally by unwinding of the webbing 28 due to the force of inertia of the occupant occurring on sudden deceleration of the vehicle, whereby the unwinding of the webbing is prevented and the occupant is restrained by the webbing 28 as well as the above way.

Furthermore, the above mentioned cases, where the webbing 28 is rapidly unwound from the take-up shaft 26 and, where the vehicle suddenly decelerates are explained separately. However, in the case that the vehicle suddenly decelerates, since the pawl 66 is fluctuated and the webbing 28 is rapidly unwound from the take-up shaft 26, the webbing 28 is prevented from unwinding in both cases.

What is claimed is:

1. A locking apparatus for a webbing retractor which retracts a webbing fastened around an occupant of a vehicle, designed to stop the unwinding of said webbing in an emergency situation of said vehicle, comprising:
   (a) a take-up shaft for winding up one end of said webbing;
   (b) movable lock means arranged at one end of said take-up shaft to be movable across the axial direction of said take-up shaft and to be prevented from large relative rotation to said take-up shaft;
   (c) fixed lock means for preventing rotation of said take-up shaft when said movable lock means is moved across the axial direction of said take-up shaft to be engaged with said fixed lock means;
   (d) a lock wheel following the rotation of said take-up shaft, maintaining said movable lock means in a resting position where said movable lock means is separated from said fixed lock means, and creating a rotational lag with respect to said take-up shaft to guide said movable lock means across the axial direction of said take-up shaft to cause said movable lock means to engage with said fixed lock means, when accelerated; and
   (e) an elastic body interpositioned between said lock wheel and said movable lock means, for pressing said movable lock means in the axial direction of said take-up shaft to abolish the clatter between said movable lock means and said take-up shaft, whereby, when the vehicle is vibrated, said movable lock means and said take-up shaft are prevented from impact therebetween so that the creation of clattering noise is prevented.

2. A locking apparatus according to claim 1, wherein said elastic body is attached to the lock wheel.

3. A locking apparatus according to claim 1, wherein said elastic body together with the lock wheel are as a whole made from synthetic resin.

4. A locking apparatus according to claim 1, wherein said elastic body is a flexible member bent in a circular arc around the axis of said lock wheel, one longitudinal end of said flexible member being fastened to said lock wheel.

5. A locking apparatus according to claim 4, wherein the other end of said flexible member extends in a webbing unwinding direction as viewed in an axial direction of said take-up shaft, whereby, even though said lock wheel creates the rotational lag in a webbing unwinding direction with respect to said take-up shaft to be rotated relative to said take-up shaft, a great frictional force is prevented from being imparted to said movable lock means.

6. A locking apparatus according to claim 5, wherein said movable lock means comprises a pair of lock members centered around the axis of said take-up shaft and said flexible member is provided as a pair to correspond to said movable lock members.

7. A locking apparatus according to claim 4, wherein said flexible member is bent along the axial direction of said take-up shaft and the other end of the flexible member is brought into contact with said movable lock means.

8. A locking apparatus according to claim 1, wherein said movable lock means is pressed onto the surface of said take-up shaft tangential to the axis of said take-up shaft.

9. A locking apparatus according to claim 1, wherein said movable lock means is arranged between the surface of said take-up shaft tangential to the axis of said take-up shaft and a protrusion projected in a radial direction from said take-up shaft and separated from said surface and said movable lock means is pressed against said surface through the resilience of the elastic body.

10. A locking mechanism for a retractor adapted to wind up a webbing of a seat belt of a vehicle, for stopping unwinding of said webbing when necessary, comprising:
   (a) a frame fixed to said vehicle;
   (b) a take-up shaft for winding up said webbing, rotatably supported to said frame;
   (c) a lock wheel rotated in accordance with the rotation of said take-up shaft, and creating a rotational lag with respect to said take-up shaft upon deceleration;
   (d) lock members rotated together with said take-up shaft and projected in a radial direction of said take-up shaft when said lock wheel creates the rotational lag with respect to said take-up shaft;
   (e) a gear fixed to said frame and engaged with said lock members projected in the radial direction to prevent said lock members and said take-up shaft from rotating in an unwinding direction of said webbing; and
   (f) an elastic body provided on said lock wheel to press said lock members in the axial direction of said take-up shaft, thereby preventing vibration of said lock members.

11. A locking mechanism according to claim 10, wherein said elastic body is formed as a whole together with said lock wheel and made from synthetic resin.

12. A locking mechanism according to claim 10, wherein said elastic body is a flexible member bent around the axis of said lock wheel in a circular arc, one longitudinal end of said flexible member being fixed to said lock wheel.

13. A locking mechanism according to claim 10, wherein said lock members are provided as a pair centering around the axis of said take-up shaft, and said flexible piece is provided as a pair to correspond to said lock members.

14. A locking mechanism according to claim 12, wherein only the order end of said flexible member contacts said lock members.

15. A locking mechanism according to claim 12, wherein said flexible member is arranged inside a through hole formed in said lock wheel.

16. A locking mechanism according to claim 15, wherein the other end of said flexible member extends in the webbing unwinding direction as viewed in the axial direction of said take-up shaft.

17. A locking mechanism according to claim 10, wherein said take-up shaft is provided with a large diameter portion and a small diameter portion and said take-up shaft is formed with a step portion between said large diameter portion and said small diameter portion, and lock wheel is pressed against said step portion by said elastic body.

18. In an apparatus for a webbing retractor provided with a lock plate disposed around a take-up shaft winding up an occupant restraining webbing of a vehicle and rotated in accordance with the rotation of said take-up shaft and a turning wheel connected to said take-up shaft in a overlapping manner and rotated in accordance with the rotation of said take-up shaft, wherein said lock plate is arranged to be movable in a direction across the axis of said take-up shaft and to be movable in a floating manner and in the axial direction of said take-up shaft, said turning wheel is connected to said lock plate and creates a rotational lag with respect to said take-up shaft in the webbing unwinding direction, thereby causing said lock plate to move in the direction across the axis of said take-up shaft, and thereby preventing the rotation of said take-up shaft in the webbing unwinding direction; the improvement wherein said turning wheel is formed integrally with an elastic deformable flexible piece and a portion of said flexible piece adjacent to a tip portion thereof is caused to abut on said lock plate, thereby pressing said lock plate on a side opposed to said turning wheel.

19. A locking mechanism according to claim 18, wherein said flexible piece is arranged inside a through hole formed in said lock wheel.

20. A locking mechanism according to claim 18, wherein said flexible piece presses said lock plate against a step portion formed in said take-up shaft.

* * * * *